L. G. HUNTINGTON,

Assignor of one-half to A. M. EAGLESON.

SIGNAL LANTERN.

No. 10,408. Reissued Nov. 20, 1883.

Witnesses —
Wm. H. Lowe
Edw. Hall

Inventor —
L. G. Huntington.
By A. M. Pierce
Atty.

N. PETERS, Photo-Lithographer, Washington, D. C.

UNITED STATES PATENT OFFICE.

LAWSON G. HUNTINGTON, OF NEW YORK, N. Y., ASSIGNOR OF ONE-HALF TO ALEXANDER M. EAGLESON, OF SAME PLACE.

SIGNAL-LANTERN.

SPECIFICATION forming part of Reissued Letters Patent No. 10,408, dated November 20, 1883.

Original No. 251,781, dated January 3, 1882. Application for reissue filed July 16, 1883.

*To all whom it may concern:*

Be it known that I, LAWSON G. HUNTINGTON, of New York, in the county of New York and State of New York, have invented certain new and useful Improvements in Signal-Lanterns; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to an improvement in signal-lanterns, having for its object to simplify the construction and operation of the same; and it consists in the construction and arrangement of parts, as will be hereinafter more fully set forth, and pointed out by the claims.

Figure 1:
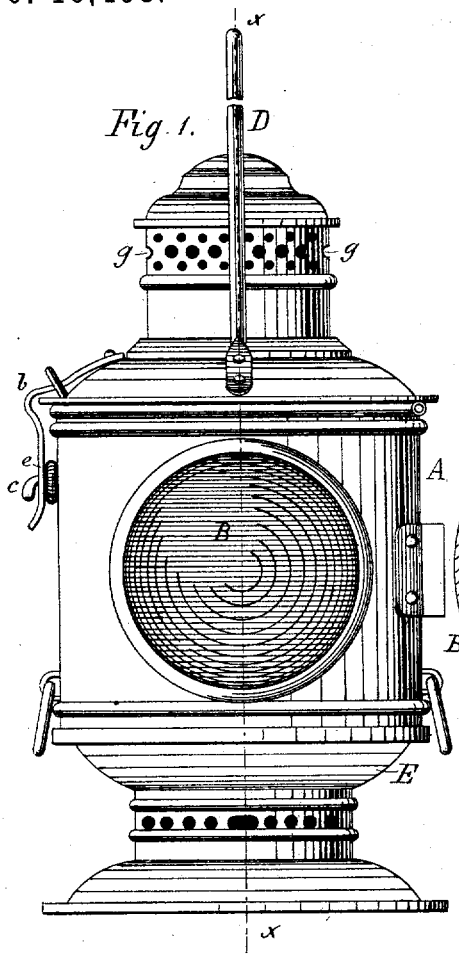
Figure 2:
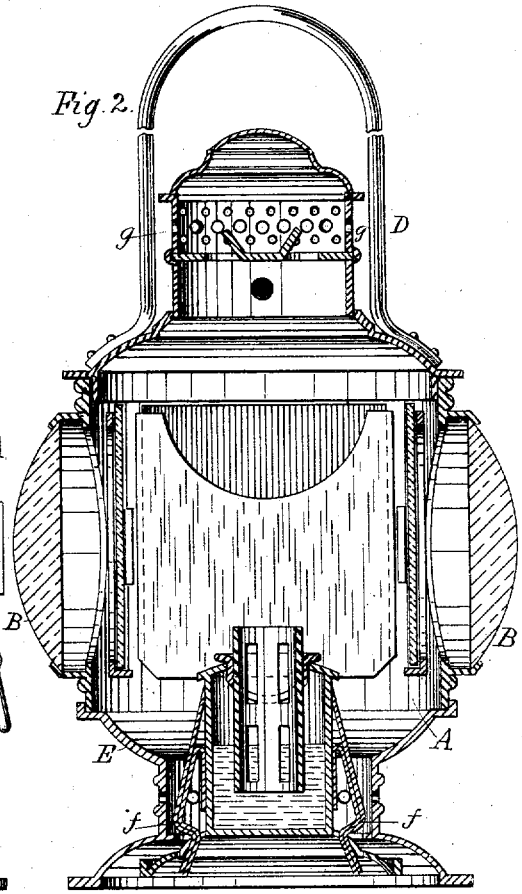
Figure 3:
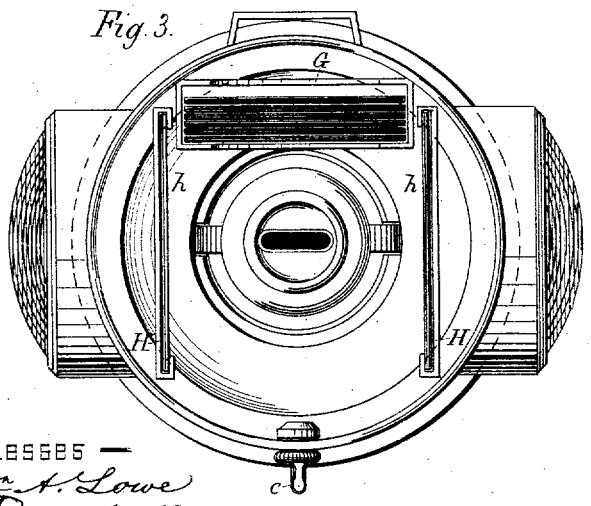
Figure 4:
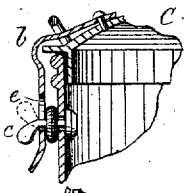
Figure 5:
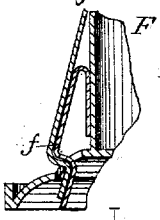

In the annexed drawings, which fully illustrate my invention, Figure 1 is a side elevation. Fig. 2 is a central vertical section. Fig. 3 is a plan view with the top removed, and Figs. 4 and 5 are details.

A represents the body of a lantern, which may be of any desired construction, and which is provided with one or more lenses, B.

E represents the base, rigidly attached to the part A, and in which is placed the lamp F, which is held in place by the springs *f*.

C represents the top, provided with the perforated dome *g*. Said top is hinged to the body at *a*, and is so constructed that it can be swung back out of the way. The top is held in place by a lock consisting of a spring, *b*, secured to the top at one end, and having in its free end an opening, *e*, which opening receives a button, *c*, in the side of the body, which is adapted to turn and lock the parts firmly together. The button *c* is so constructed that it will fall down by its own weight, and is not liable to turn upward and permit the unlocking of the top.

D is a bail rigidly attached to the top C, and by which the lantern is carried. In the interior of the body of the lantern, at the rear of the lenses, are slides H, adapted to receive and hold the different-colored glasses *h* when in use. Upon the spare sides of the interior of the lantern are secured one or more pockets, G, which are adapted to receive and hold the glasses when not in use.

In the use of signal-lanterns many inconveniences have arisen, among which is the necessity of carrying two or more lanterns with different-colored glasses. Then, again, the lantern has been constructed with exterior pockets to receive and hold the spare glasses; but this was objectionable, as they were liable to breakage and many other inconveniences. By my arrangement of packing the glasses upon the interior of an open-top lantern they are easy of access, and all danger of breakage, &c., is obviated.

I am aware of the patents issued to Fowle, October 7, 1879, No. 220,230, signal-lanterns; to Ward, January 7, 1862, No. 34,079, signal-semaphores, and to Mills, Bell, and Cary, January 4, 1876, No. 171,834, locomotive head-lights; and to the devices therein shown and described I make no claim.

Having thus fully described my invention, what I claim as new, and desire to secure by Letters Patent, is—

1. In a signal-lantern of the character herein specified, the combination, with the body bearing one or more lenses, of a pocket for receiving the separate removable spare glasses, and a slide or slides adapted and arranged to hold a glass between the lamp and lens, substantially as shown and described.

2. A portable signal-lantern having a body, A, provided with base E and hinged top C, removable lamp F, pocket G, to receive the removable separate spare glasses, and one or more slides, H, said pocket and slides being arranged within the body of the lantern, substantially as and for the uses and purposes shown and described.

3. A portable signal-lantern having a body, A, provided with base E and hinged top C, removable lamp F, secured in place by means of springs *f f*, pocket G, and slides H, arranged within the body of the lamp for the reception of the glasses, substantially as shown and described.

In testimony that I claim the foregoing I have hereunto set my hand in the presence of two witnesses.

LAWSON G. HUNTINGTON.

Witnesses:
A. M. PIERCE,
L. VAN WYCK.